(12) United States Patent
Iijima

(10) Patent No.: US 8,098,446 B2
(45) Date of Patent: Jan. 17, 2012

(54) LENS BARREL AND CAMERA

(75) Inventor: Shuji Iijima, Yokohama (JP)

(73) Assignee: Nikon Corporation, Tokyo (JP)

( * ) Notice: Subject to any disclaimer, the term of this patent is extended or adjusted under 35 U.S.C. 154(b) by 68 days.

(21) Appl. No.: 12/155,139

(22) Filed: May 29, 2008

(65) Prior Publication Data

US 2008/0297924 A1    Dec. 4, 2008

(30) Foreign Application Priority Data

May 29, 2007  (JP) ................................. 2007-142367
May 26, 2008  (JP) ................................. 2008-136333

(51) Int. Cl.
*G02B 7/02* (2006.01)
(52) U.S. Cl. ........................................................ 359/826
(58) Field of Classification Search .................... 359/826
See application file for complete search history.

(56) References Cited

U.S. PATENT DOCUMENTS

| | | | |
|---|---|---|---|
| 4,974,949 A | 12/1990 | Tanaka | |
| 5,861,998 A | 1/1999 | Nishimura | |
| 5,974,268 A * | 10/1999 | Washisu | ........................... 396/55 |
| 2004/0062536 A1 | 4/2004 | Nomura | |
| 2006/0158745 A1* | 7/2006 | Nakamura | ..................... 359/704 |
| 2007/0092246 A1 | 4/2007 | Aoki et al. | |

FOREIGN PATENT DOCUMENTS

| | | |
|---|---|---|
| EP | 0 609 913 | 8/1994 |
| EP | 1 777 584 | 4/2007 |
| JP | 10-73753 | 3/1998 |

OTHER PUBLICATIONS

Extended European Search Report issued Sep. 25, 2008 in corresponding European Patent Application No. 08157198.6.

* cited by examiner

*Primary Examiner* — Joseph P Martinez

(57) ABSTRACT

A small-sized lens barrel and camera have the following configuration. The lens barrel has a first barrel, a second barrel movable between retracted position retracted in the inner diameter side of the first barrel and shooting position shifted toward the incident side in an optical axis direction with respect to the first barrel, a lens moved relative to the second barrel, a support part formed into a ring shape and supported by the end of the first barrel on the exit side in the optical axis direction, the support part being arranged on the inner diameter side of the first barrel, a projecting part formed so as to project in the optical axis direction from the end of the second barrel on the exit side in the optical axis direction, and an accommodating part being formed at the support part and accommodating the projecting part at the retracted position.

7 Claims, 4 Drawing Sheets

LENS BARREL AND CAMERA

The disclosure of the following priority application is herein incorporated by reference: Japanese Patent Applications No. 2007-142367 filed on May 29, 2007 and No. 2008-136333 filed on May 26, 2008.

BACKGROUND OF THE INVENTION

1. Field of the Invention

The present invention relates to a lens barrel and a camera.

2. Description of the Related Art

Cameras in which a lens barrel can be retracted within a camera body during a non-shooting period are known (for example, see Japanese Unexamined Patent Application Publication No. 10-73753).

Recently, there has been a tendency for cameras to be miniaturized and thinner. There is a desire for a lens barrel having a small dimension in the optical axis direction during the retracting thereof.

SUMMARY OF THE INVENTION

It is an object of the present invention to provide a reduced-sized lens barrel and camera.

In order to achieve the object mentioned above, according to a first aspect of the present invention, there is provided a lens barrel including a first barrel, a second barrel configured to be movable between a retracted position in which the second barrel is retracted inside of the first barrel and a shooting position in which the second barrel is displaced, relative to the first barrel, more toward an incident side than the retracted position, in a direction of an optical axis of the first barrel, an image blur correction unit guided by a cam, the image blur correction unit being movable in the optical axis as the second barrel is rotated and accommodating an image blur correction lens to correct image blur, a support part provided at an end of the first barrel on an exit side in the direction of the optical axis of the first barrel, having a base parallel with a plane intersecting the optical axis, the support part being arranged on an inner diameter side of the first barrel and being provided with a rectilinear key to restrict rotation of the image blur correction unit, a projecting part configured to project on the exit side in the direction of the optical axis of the first barrel from an end of the second barrel, and an accommodating part formed at the base configured to accommodate the projecting part when the second barrel lies at the retracted position and to not accommodate the projecting part when the second barrel lies at the shooting position, a portion of the cam being located at the projecting part, wherein, when the second barrel is in the shooting position, the image blur correction unit and the base of the support part are arranged at a position causing no interference with respect to one another.

In the first aspect of the present invention, the support part may have a connection region connected to the first barrel and a non-connection region not connected to the first barrel and at least part of the non-connection region may function as the accommodating part.

The connection region may have a space part formed continuously with the non-connection region and the space part and at least part of the non-connection region may cooperatively function as the accommodating part.

The first barrel may be provided with a cam follower projecting toward the outer diameter side and is relatively rotatable around a predetermined axis with respect to the support part, and the cam follower may be arranged at a position that enables the position in the direction around the axis to be overlapped with the connection region in accordance with a relative rotation between the first barrel and the support part.

When the support part and the first barrel are relatively rotate in a shooting state in which the second barrel is arranged at a shooting position, the cam follower may be moved within a range where the position in the direction around the axis is overlapped with the connection region.

When the support part and the first barrel are relatively rotation in a shooting state in which the second barrel is arranged at a shooting position, the cam follower may be moved between a first position and a second position, and when the cam follower is in at least one of the first position and the second position, the position of the cam folower in the direction around the axis may be overlapped with the connection region.

When the support part and the first barrel are relatively rotate in a shooting state in which the second barrel is arranged at a shooting position, the cam follower may be moved between a first position and a second position, and when the cam follower is in at least one of the first position and the second position, the position of the cam folower in the direction around the axis may be overlapped with a region near a boundary between the connection region and the non-connection region.

The lens barrel further may comprise an image blur correction unit that accommodates an image blur correction lens to correct image blur, and when the second barrel is in a shooting position, the image blur correction unit and the support part may be arranged at a position causing no interference with respect to one another.

According to a second aspect of the present invention, there is provided a camera including the lens barrel as described above, and an image pickup part to expose a subject beam after passing through the lens included in the lens barrel.

BRIEF DESCRIPTION OF THE DRAWINGS

In the drawings attached.

DETAILED DESCRIPTION OF THE INVENTION

Figure 1:
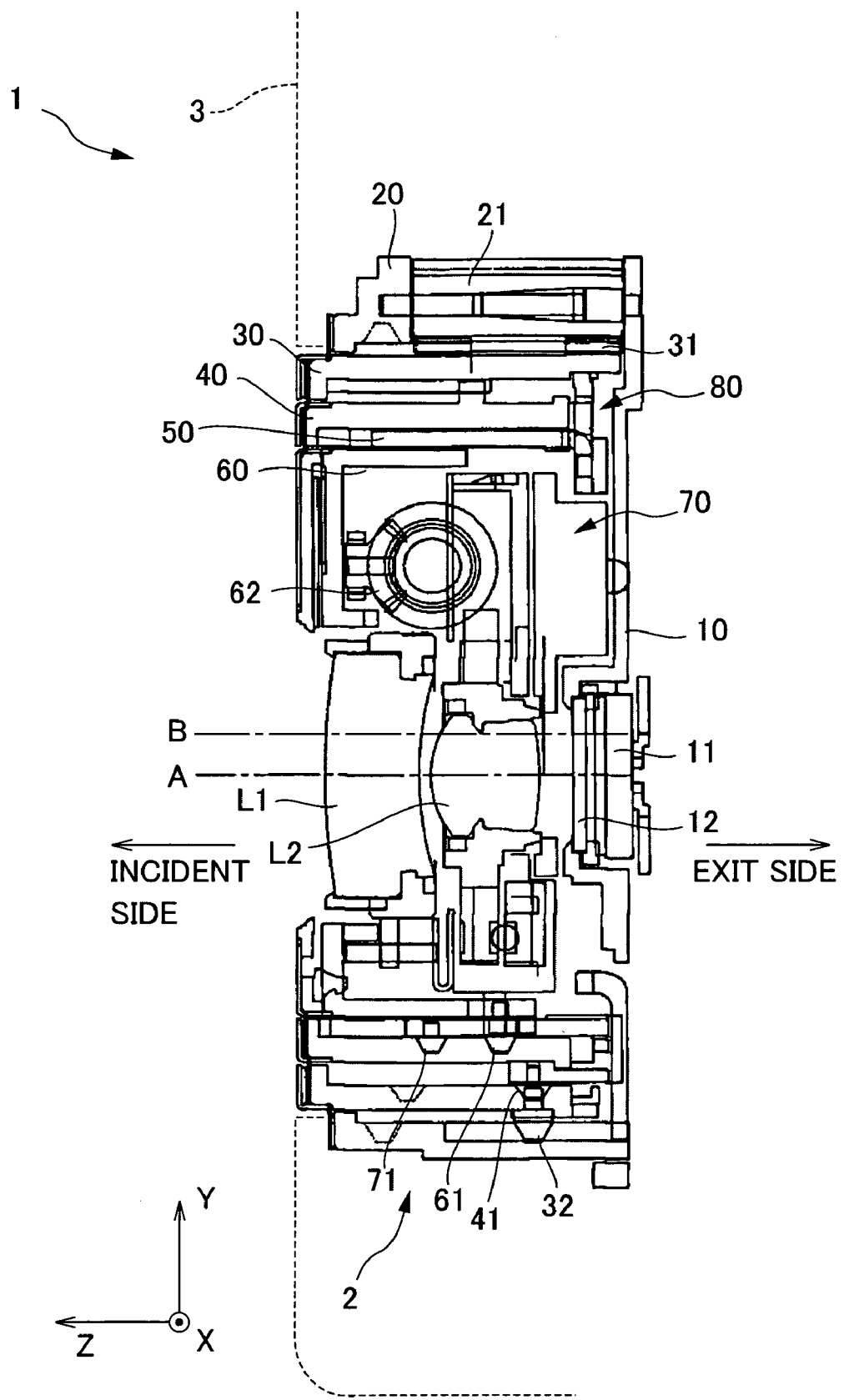
FIG. 1 is a sectional view showing a camera provided with a lens barrel of a preferred embodiment, particularly showing the retracted position thereof.

Preferred embodiments of the lens barrel and the camera, to which the present invention is applied, will be described below with reference to the accompanying drawings. In order to simplify the understanding of the embodiments, a coordinate system formed by x, y and z axes will be suitably set for the purpose of explanation.

A lens barrel 2 included in a camera 1 is a collapsible type lens barrel which is retracted within a camera body 3 during a non-shooting period, and a part thereof is projected from the camera body 3 during a shooting period.

The lens barrel 2 has a first lens unit L1, a second lens unit L2, a CCD (charge coupled device) mount 10, a fixed barrel 20, a middle barrel 30, a cam barrel 40, a rectilinear guide barrel 50, a rectilinear barrel 60, an image blur correction unit 70 and a rectilinear guide part 80.

The first lens unit L1 and the second lens unit L2 are arranged in this order from the incident side (the subject side) to the exit side (the image pickup part side) along the direction of the optical axis A. The first lens unit L1 and the second lens unit L2 form a two-unit configuration zoom lens. The first lens unit L1 functions as a focus lens, and the second lens unit L2 functions as an image blur correction lens.

At the normal shooting position of the camera 1, the optical axis A of the first lens unit L1 and the second lens unit L2 is arranged below a central axis B of the middle barrel 30 and the cam barrel 40 to be described later. In the specification of the present invention, the normal shooting position of the camera 1 indicates the attitude of the camera 1 when a transversely elongated image is shot with the optical axis A horizontal.

The CCD mount 10 holds the CCD 11 and LPF (low-pass filter) 12.

The CCD 11 is arranged on the exit side of the second lens unit L2, and firmly secured to the CCD mount 10. The CCD 11 is the image pickup part of the camera 1, provided with a photoelectric conversion device that converts the subject beam passing through the first and second lens units L1 and L2, into an electric signal and outputs the electrical signal.

The LPF 12 is for preventing moire from occurring in the subject image formed on the CCD 11. The LPF 12 is arranged between the second lens unit L2 and the CCD 11. Like the CCD 11, the LPF 12 is firmly secured to the CCD mount 10.

The fixed barrel 20 is the barrel nearest the outer diameter among a plurality of barrels constituting the lens barrel 2. The fixed barrel 20 is firmly secured to the camera body 3. The abovementioned CCD mount 10 is firmly secured to the end of the fixed barrel 20 on the exit side in the direction of the optical axis A. For the sake of convenience, FIG. 1 and FIG. 2 show different cross sections of the fixed barrel 20 in order to explain the following configurations of a gear 21 and a rectilinear guide groove 22.

The fixed barrel 20 has the gear. 21 as shown in FIG. 1. The gear 21 is rotationally driven by a motor firmly secured to the CCD mount 10, through a reducing gear train (the motor and the reducing gear train are not shown).

Figure 2:
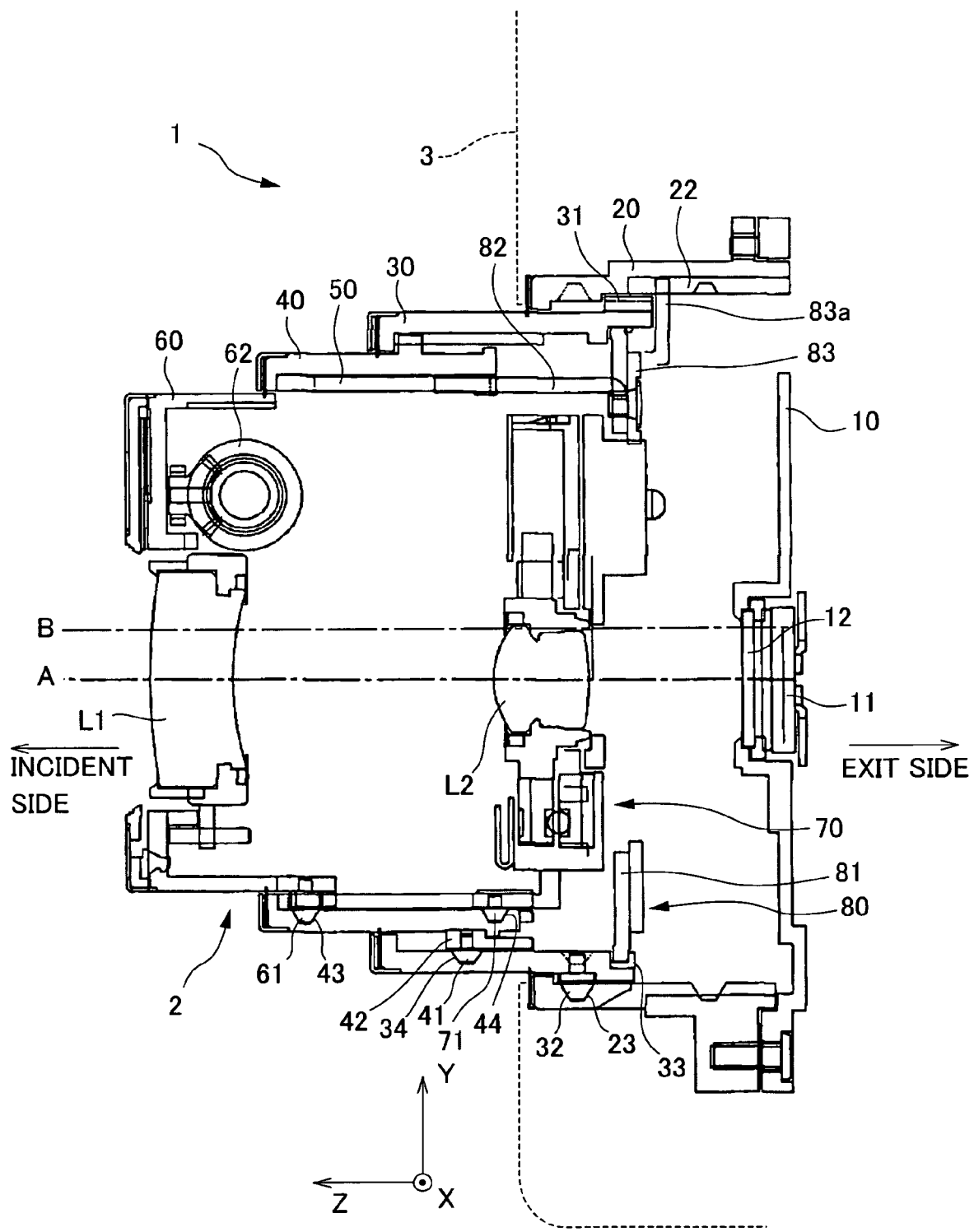
FIG. 2 is a sectional view showing the camera provided with the lens barrel of the preferred embodiment, particularly showing the shooting position thereof.

The fixed barrel 20 has at the inner peripheral surface thereof the rectilinear guide groove 22 extending in the direction of the optical axis A, as shown in FIG. 2. The projection 83a of a stopper ring 83 to be described later is inserted into the rectilinear guide groove 22.

The middle barrel 30 is the first barrel inserted into the inner diameter side of the fixed barrel 20. The middle barrel 30 has a gear 31 engaged with the abovementioned gear 21, on the outer peripheral surface thereof on the exit side in the direction of the optical axis A. The middle barrel 30 has a cam follower 32 on the outer peripheral surface thereof. The cam follower 32 is inserted into the cam groove 23 (see FIG. 2) formed on the inner peripheral surface of the fixed barrel 20. The tip of the cam follower 32 is formed with a taper.

The middle barrel 30 has a fixing ring 33 firmly secured to the end of the exit side in the direction of the optical axis A (see FIG. 2). The fixing ring 33 is formed into a ring shape, and a rectilinear guide part 80 described later is slidably mounted on the inner diameter side thereof.

The cam barrel 40 is the second barrel inserted into the inner diameter side of the middle barrel 30. The cam barrel 40 is configured to rotate integrally with the middle barrel 30 around the central axis B.

A guide part 42 having a cam follower 41, which is inserted into the cam groove 34 (see FIG. 2) formed on the inner peripheral surface of the middle barrel 30, is formed on the outer diameter side of the cam barrel 40. The guide part 42 is limited in its rotation around the central axis B, and is moved rectilinearly in the direction of the optical axis A as the middle barrel 30 is rotated. The guide part 42 and the cam barrel 40 are connected to each other to permit a relative rotation around the central axis B. When the cam guide part 42 is moved in the direction of the optical axis A, the cam barrel 40 is correspondingly moved in the direction of the optical axis A, while being rotated integrally with the middle barrel 30 in the direction of the optical axis A.

Figure 3:
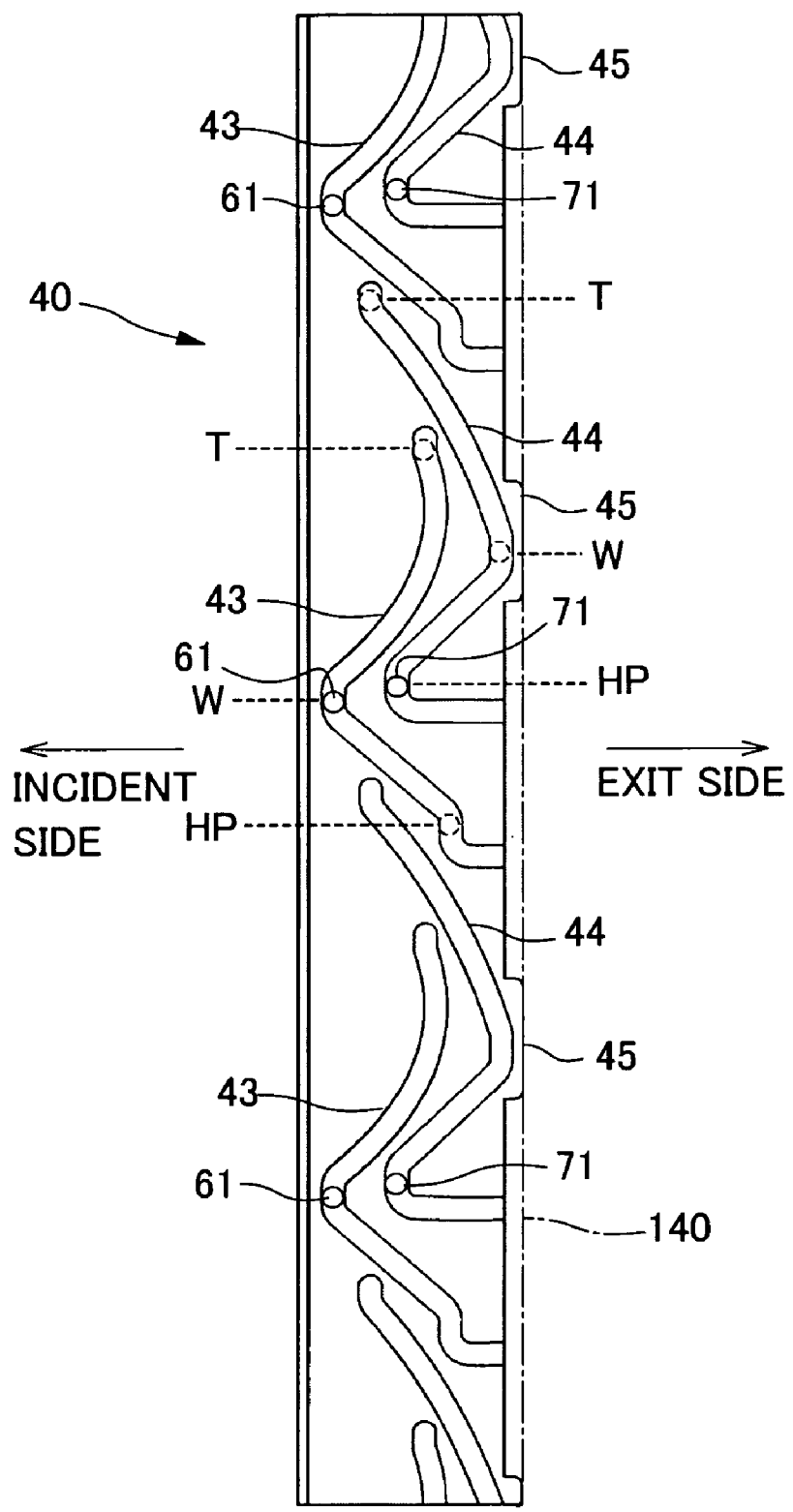
FIG. 3 is an extended view showing the inner peripheral surface of a cam barrel included in the lens barrel shown in FIG. 1.

The cam barrel 40 has two-system cam grooves 43 and 44 on the inner peripheral surface thereof, as shown in FIG. 3. A cam follower 61 of a rectilinear barrel 60 described later is inserted into the first cam groove 43. A cam follower 71 included in an image blur correction unit 70 described later is inserted into the second cam groove 44. Three such cam grooves 43 and three such cam grooves 44 are formed along the circumferential direction of the cam barrel at substantially equally spaced intervals.

The cam profile of the cam groove 43 has a substantially V-shaped form opening toward the exit side in the direction of the optical axis A. The cam follower 61 to be inserted into the cam grooves 43 is arranged nearest the exit side in the direction of the optical axis A at a retracted position HP of the lens barrel 2, and arranged nearest the incident side in the direction of the optical axis A at a wide position W having the shortest focal distance of the zoom lens. In a tele position T having the longest focal distance of the zoom lens, the cam follower 61 is arranged at a position that is more towards the exit side in the optical axis direction than the wide position W, and more towards the incident side in the optical axis direction than the retracted position HP.

On the other hand, the cam profile of the cam groove 44 has a substantially V-shape form opening toward the incident side in the direction of the optical axis A. A cam follower 71 to be inserted into the cam grooves 44 is arranged nearest the incident side in the direction of the optical axis A at the tele position T, and arranged nearest the exit side in the direction of the optical axis A at the wide position W. At the retracted position HP of the lens barrel 2, the cam follower 71 is configured to be arranged at a position that is more towards the incident side in the direction of the optical axis A than the wide position W, and more towards the exit side in the direction of the optical axis A than the tele position T.

The cam barrel 40 has a projecting part 45 at the end on the exit side in the direction of the optical axis A.

As the projecting part 45, for example, three regions located at the end of the cam barrel 40 on the exit side in the direction of the optical axis A are formed so as to project toward the exit side in the direction of the optical axis A. These three projecting parts 45 are arranged at substantially equally spaced intervals around the central axis B. Compared with the region of the cam barrel 40 having the projecting part 45, the other regions have a smaller dimension in the direction of the optical axis A.

The cam groove 44 has a boundary part between a region where the image blur correction unit 70 is driven between the retracted position HP and the wide position W, and a region where it is driven between the wide position W and the tele position T (i.e. the part for inverting the moving direction of the image blur correction unit 70). The boundary part is formed at the projecting part 45.

The rectilinear guide barrel 50 is the barrel inserted into the inner diameter side of the cam barrel 40.

The rectilinear guide barrel 50 has a groove (not shown), into which a rectilinear key 82 formed in a rectilinear guide part 80 described later is inserted, and the rotation around the central axis B is restricted. The rectilinear guide barrel 50 restricts the rotations around the central axis B of a rectilinear barrel 60 described later and the image blur correction unit 70.

The rectilinear barrel 60 is the barrel inserted into the inner diameter side of the rectilinear guide barrel 50, and arranged nearest the incident side at the shooting position of the camera 1 shown in FIG. 2, among the plurality of barrels constituting the lens barrel 2.

The rectilinear barrel 60 has a cam follower 61 on the outer peripheral surface thereof. The cam follower 61 is inserted into the cam groove 43 formed on the cam barrel 40 as described above. The rectilinear barrel 60 is limited in its rotation around the central axis B by the rectilinear guide barrel 50, and is moved rectilinearly in the direction of the optical axis A as the cam barrel 40 is rotated.

The first lens unit L1 and actuator 62 are accommodated in the inner diameter side of the rectilinear barrel 60. For example, during an autofocus operation, in response to a signal from a controller (not shown) provided in the camera 1, the actuator 62 causes the first lens unit L1 to move in the direction of the optical axis A with respect to the rectilinear barrel 60.

The image blur correction unit 70 is a publicly known image blur correction unit that performs image blur correction to the subject image formed on the CCD 11 by causing the second lens unit L2 to shift within a plane orthogonal to the optical axis A, in accordance with the output of a sensor (not shown) for detecting a change in the attitude of the camera 1.

The image blur correction unit 70 has a cam follower 71 to be inserted into the cam groove 44 formed on the cam barrel 40. The rotation round the central axis B of the image blur correction unit 70 is restricted by the rectilinear guide barrel 50, and is moved rectilinearly in the direction of the optical axis A as the cam barrel 40 is rotated.

Next, the rectilinear guide part 80 will be described below.

The rectilinear guide part 80 is a support part which is formed in a ring shape and supported via a fixed ring 33 by the end of the middle barrel 30 on the exit side in the direction of the optical axis A. The rectilinear guide part 80 is connected to the middle barrel 30 so as to be relatively rotatable around the central axis B.

Figure 4A:
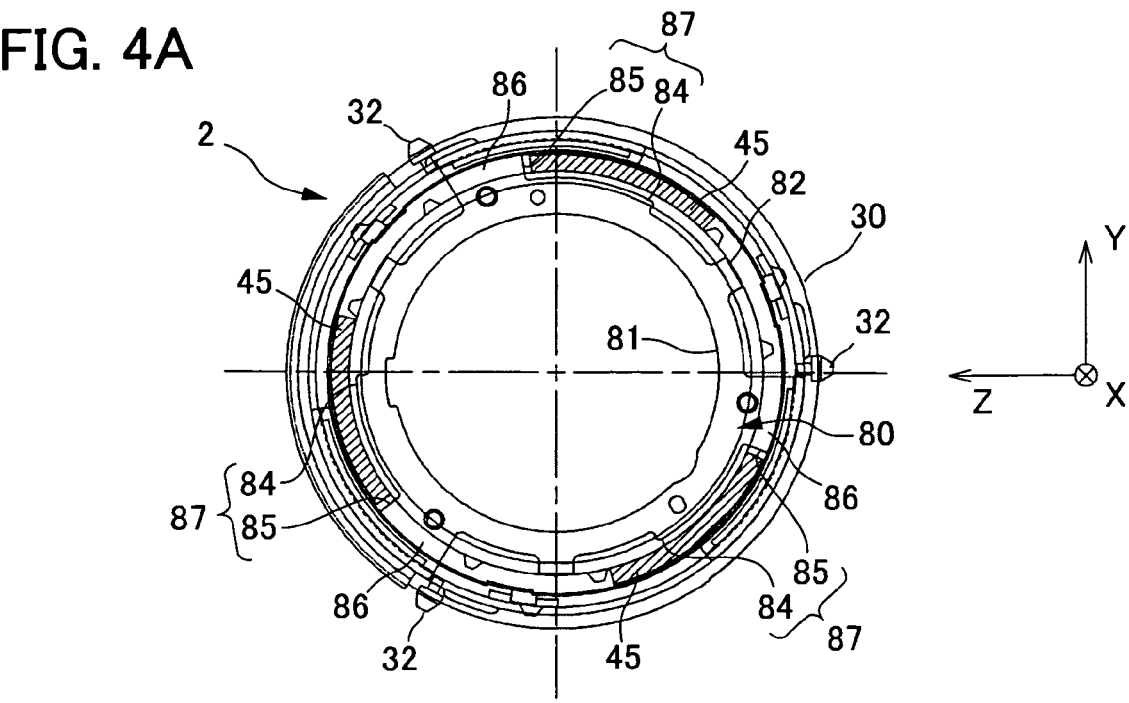
FIG. 4A is a diagram showing a rectilinear guide part included in the lens barrel shown in FIG. 1, particularly showing the retracted position in FIG. 1.
Figure 4B:
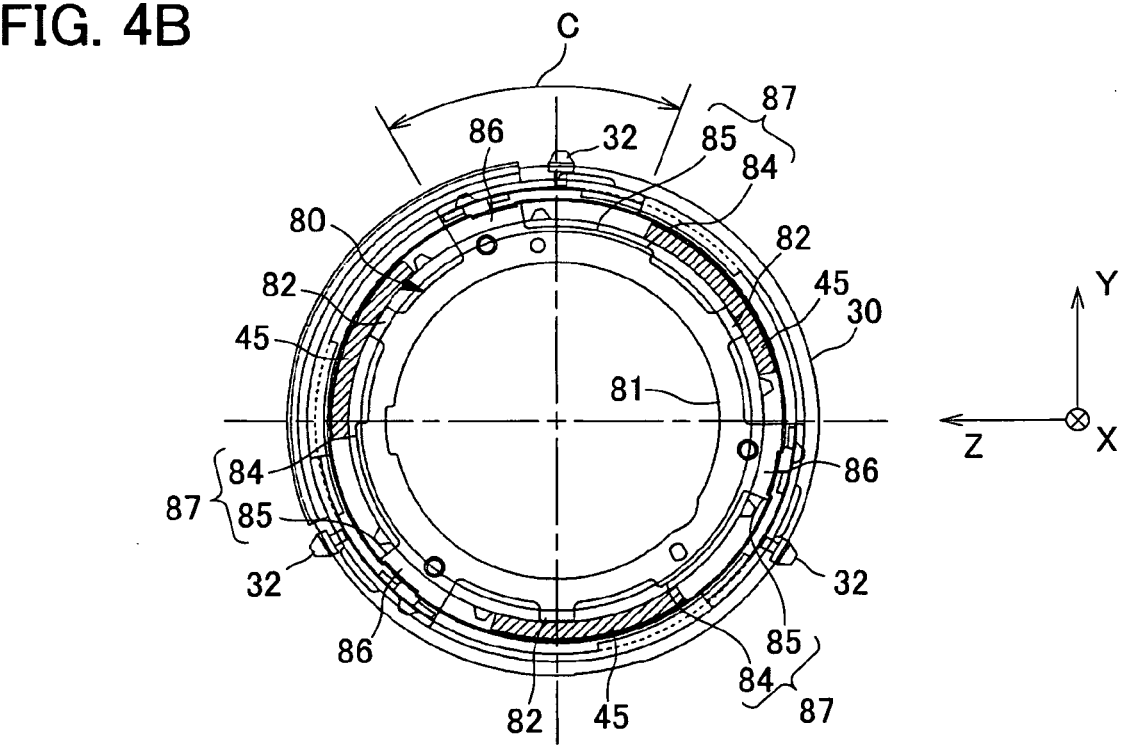
FIG. 4B is a diagram showing the rectilinear guide part included in the lens barrel shown in FIG. 1, particularly showing the shooting position in FIG. 2.

As shown in FIGS. 4A and 4B, the rectilinear guide part 80 is provided with a base 81, the rectilinear key 82, the stopper ring 83, a first notch 84 and a second notch 85.

The base 81 is the base of the rectilinear guide part 80 and is formed in a ring shape being arranged coaxially with the middle barrel 30. In the present specification, the radial direction of the base 81 and the circumferential direction of the base 81 are hereinafter referred to simply as "radial direction" and "circumferential direction," respectively.

The rectilinear key 82 is for rectilinearly guiding the rectilinear guide barrel 50, and formed so as to project from the base 81 toward the incident side in the direction of the optical axis A. For example, three rectilinear keys 82 are arranged at substantially equally spaced intervals around the central axis B.

As shown in FIG. 2, the stopper ring 83 is arranged on the exit side in the direction of the optical axis A in the base 81, and firmly secured to the base 81 by a screw. The stopper ring 83 is provided with a projection 83a formed so as to project toward the outer diameter side. The projection 83a is inserted into the rectilinear guide groove 22 formed on the fixed barrel 20, and restricts the rotation of the rectilinear guide part 80 around the central axis B.

The first notch 84 is formed by causing the outer peripheral edge of the base 81 to be recessed toward the inner diameter side. For example, the notch 84 is arranged at three locations at substantially equally spaced intervals around the central axis B.

In the outer peripheral edge of the rectilinear guide part 80, the regions where the first notch 84 is formed correspond to the non-connection region not connected to the middle barrel 30. A space part is formed between the middle barrel 30 and the rectilinear guide part 80. On the other hand, the portion other than the regions where the first notch 84 is formed in the rectilinear guide part 80 is connected to the middle barrel 30. The connection region connected to the middle barrel 30 in the rectilinear guide part 80 is hereinafter referred to as a connecting part 86.

The second notch 85 is a space part formed so that the radial middle part of the connecting part 86 is cut away in the circumferential direction. The second notch 85 is opened to one end of the connecting part 86, and formed continuously with the first notch 84. The expression that the first notch 84 and the second notch 85 are formed continuously means that the first notch 84 and the second notch 85 are connected to each other, thereby forming a single space.

The lens barrel 2 is configured so that, at the retracted position as shown in FIG. 1 and FIG. 4A, the projecting part 45 formed on the cam barrel 40 is accommodated in a portion of the first notch 84 and in the second notch 85. The part accommodating the projecting part 45 at the retracted position of the lens barrel 2 (a portion of the first notch 84 and the second notch 85) is hereinafter referred to as an accommodating part 87.

Next, the positional relationship between the cam follower 32 of the middle barrel 30 and the connecting part 86 will be described below.

The middle barrel 30 rotating around the central axis B causes the cam barrel 40 to rotate. The rotation of the cam barrel 40 causes the zoom lens formed by the first lens unit L1 and the second lens unit L2 to move between the wide position and the tele position.

The moving range when the cam follower 32 is moved between the wide position and the tele position is within a region overlapped in the radial direction with the connecting part 86 (indicated by reference C in FIG. 4B). Within the region C, the position of the cam follower 32 in the direction around the central axis B is overlapped with the position of the connecting part 86 in the direction around the central axis B.

For example, at the wide position of the zoom lens as shown in FIG. 4B, the position of the cam follower 32 is overlapped in the radial direction with the connecting part 86. When the zoom lens is driven from the wide position to the tele position, the cam follower 32 rotates around the central axis B with respect to the connecting part 86. The cam follower 32 is arranged so as to be overlapped in the radial direction with the connecting part 86 even at the tele position (the position of the cam follower 32 at the tele position is not shown).

Next, the operation of the lens barrel 2 will be described below.

When the power switch of the camera 1 is turned on by a user such as a photographer, the gear 21 rotates, and the middle barrel 30 rotates around the central axis B. The middle barrel 30 is guided and extended toward the incident side in the direction of the optical axis A by the cam groove 23 formed on the fixed barrel 20.

As the middle barrel 30 is thus extended toward the incident side in the direction of the optical axis A, the rectilinear guide part 80 is correspondingly moved rectilinearly in the direction of the optical axis A.

The cam barrel 40 is rotated as the middle barrel 30 is rotated. The cam barrel 40 is guided and extended toward the incident side in the direction of the optical axis A by the cam groove 34 formed on the middle barrel 30.

As the cam barrel 40 is rotated around the central axis B, the rectilinear barrel 60 and the image blur correction unit 70 are guided and moved rectilinearly toward the incident side in the direction of the optical axis A by the cam grooves 43 and 44 formed on the cam barrel 40. Thus, the camera 1 assumes the shooting position (the wide position W) as shown in FIG. 2 and FIG. 4B.

When the power switch is turned off by the user at the shooting position, the gear 21 is reversely rotated to cause each barrel to reversely move toward the exit side in the direction of the optical axis A, resulting in the retracted position as shown in FIG. 1 and FIG. 4A.

When the lens barrel 2 assumes the retracted position shown in FIG. 4A, the projecting part 45 formed on the cam barrel 40 is held in the accommodating part 87 of the rectilinear guide part 80.

When the cam barrel 40 is moved from the retracted position to the shooting position, the cam barrel 40 is extended toward the incident side in the direction of the optical axis A, while being rotated around the optical axis B. The projecting part 45 is correspondingly released from the accommodating part 87.

The effects of the lens barrel 2 of the present preferred embodiment will be described below.

For enhancing the blur correction performance by the image blur correction lens (the second lens unit L2), a larger movable range of the image blur correction lens in a direction orthogonal to the optical axis is more desirable. Therefore, in the state in which the lens barrel is in the shooting position (between the wide end and the telescopic end of the zoom lens), the base 81 of the rectilinear guide part 80 is preferably located such a position as not to interfere with the image blur correction unit 70. Hence, the present preferred embodiment is configured to prevent the occurrence of the abovementioned interference by arranging the base 81 of the rectilinear guide part 80 on the exit side in the direction of the optical axis A in the middle barrel 30.

However, merely by arranging the base 81 of the rectilinear guide part 80 on the exit side in the direction of the optical axis A in the middle barrel 30, the length in the optical axis direction of the barrel at the retracted position may be increased by the amount of the dimension of the base 81. To avoid this, in the preferred embodiment, the dimension of the cam barrel 40 in the direction of the optical axis A is further reduced.

However, as shown in FIG. 3, it is difficult to reduce the dimension of the cam barrel 40 at a portion of cam groove 44 which is used to reverse the moving direction of the image blur correction unit 70. Hence, in the present preferred embodiment, the projecting part 45 is provided at such a boundary portion. The first notches 84 and the second notches 85 are formed so that the projecting part 45 does not interfere with the base 81 of the rectilinear guide part 80.

Owing to the foregoing configuration, the preferred embodiment is capable of providing the lens barrel achieving high blur correction performance and which is thin in the optical axis direction.

The effects of the lens barrel 2 of the present preferred embodiment will be described by comparison with a comparative lens barrel.

A cam barrel 140 included in the comparative lens barrel (the comparative cam barrel 140 is shown by the dash-single-dot line in FIG. 3) has the same cam grooves 43 and 44 as in the cam barrel 40 of the preferred embodiment. The cam barrel 140, however, does not have any component corresponding to the projecting part 45 formed on the cam barrel 40 of the preferred embodiment, and the length in the direction of the optical axis A is constant. Therefore, at the retracted position of the lens barrel, all of the comparative cam barrel 140 is arranged more towards the incident side in the direction of the optical axis A than the rectilinear guide part 80.

On the other hand, in the lens barrel 2 of the preferred embodiment, the projecting part 45 is held in the accommodating part 87 at the retracted position. In this state, a part of the cam barrel 40 (i.e. the projecting part 45) and the rectilinear guide part are overlapped with each other in the position in the direction of the optical axis A. Therefore, in the lens barrel 2, the dimension in the direction of the optical axis A at the retracted position can be reduced by the amount of the projection length of the projecting part 45 compared to the case of the comparative lens barrel.

Although the projecting part 45 has been described as being formed so as to project from the end of the cam barrel 40 on the exit side in the direction of the optical axis A, it is also possible to describe it as being formed by recessing the end on the exit side in the direction of the optical axis A toward the incident side in the direction of the optical axis A. In the lens barrel 2 of the preferred embodiment, the projecting part 45 is formed by recessing the region not having the cam groove 44. It is thus possible to achieve miniaturization while ensuring the function of the cam barrel 40.

The lens barrel 2 of the preferred embodiment also produces the following effect.

The lens barrel 2 at the shooting position, in which the rectilinear barrel 60 and the like are projecting toward the incident side from the camera body 3, may be subjected to a shock in the direction of the optical axis A. The cam follower 32 of the middle barrel 30 is pressed by the cam groove 23 when the shock in the direction of the optical axis A is exerted on the lens barrel 2. Since the tip of the cam follower 32 is formed with a taper, when the cam follower 32 is pressed in the direction of the optical axis A by the cam groove 23, the middle barrel 30 will be deformed inwardly in the radial direction by its component of force.

In the lens barrel 2 of the preferred embodiment, the cam follower 32 and the connecting part 86 of the rectilinear guide part 80 are overlapped with each other in the radial direction as shown in FIG. 4B. Accordingly, the force that causes the middle barrel 30 to be deformed inwardly in the radial direction can be transmitted through the connecting part 86 to the base 81. The base 81, which is formed in a ring shape, functions as a rigid reinforcing member against the pressure from the radial direction, thereby improving the rigidity of the middle barrel 30 in the radial direction. This prevents deformation of the middle barrel 30.

[Modifications]

The configurations of the lens barrel and the camera of the present invention are not limited to the foregoing preferred embodiment, and it is possible to make modifications and changes such as those described below, which are also included in the technical scope of the present invention.

(1) The support part of the preferred embodiment is the rectilinear guide part to rectilinearly guide other barrels.

Alternatively, the support part may not have the abovementioned function as long as it is arranged on the inner diameter side of the first barrel. Although the second barrel is the cam barrel having the cam groove, no particular limitation is imposed on the function of the second barrel.

(2) In the preferred embodiment, the cam follower is arranged so that the connecting part and the circumferential position are overlapped with each other in both the wide position and the tele position. Alternatively, the cam follower may be arranged so as to be overlapped with the connecting part only at one position (for example, the tele position having a large amount of projection from the camera body).

(3) In the lens barrel, as long as the cam follower is positioned near the boundary part between the connecting part and the non-connecting part at the shooting position, it is not required to be overlapped with the connecting part in the radial direction. This can also produce substantially the same effect as the preferred embodiment (i.e. the improved rigidity of the first barrel).

(4) Although the lens barrel of the preferred embodiment is the collapsible type lens barrel which is held within the camera body during the non-shooting period, the type of lens barrel is not limited to this. The present invention is applicable to, for example, an interchangeable lens barrel detachably mountable on the camera body.

What is claimed is:

1. A lens barrel comprising:
    a first barrel;
    a second barrel configured to be movable between a retracted position in which the second barrel is retracted inside of the first barrel and a shooting position in which the second barrel is displaced, relative to the first barrel, more toward an incident side than the retracted position, in a direction of an optical axis of the first barrel;
    an image blur correction unit guided by a cam, the image blur correction unit being movable in the optical axis as the second barrel is rotated and accommodating an image blur correction lens to correct image blur;
    a support part provided at an end of the first barrel on an exit side in the direction of the optical axis of the first barrel, having a base parallel with a plane intersecting the optical axis, the support part being arranged on an inner diameter side of the first barrel and being provided with a rectilinear key to restrict rotation of the image blur correction unit;
    a projecting part configured to project on the exit side in the direction of the optical axis of the first barrel from an end of the second barrel; and
    an accommodating part formed at the base configured to accommodate the projecting part when the second barrel lies at the retracted position and to not accommodate the projecting part when the second barrel lies at the shooting position, a portion of the cam being located at the projecting part,
    when the second barrel is in the shooting position, the image blur correction unit and the base of the support part are arranged at a position causing no interference with respect to one another.

2. A camera comprising:
    the lens barrel according to claim 1; and
    an image pickup part to expose a subject beam after passing through the lens included in the lens barrel.

3. The lens barrel according to claim 1, wherein the cam comprises a cam groove that extends along the projectinq part and at least part of the second lens barrel.

4. The lens barrel according to claim 1,
    wherein the support part comprises a connection region in contact with the first barrel so as to support the first barrel and a non-connection region arranged to be apart from the first barrel in a direction of a diameter of the first barrel, and
    wherein the projecting part at least partially overlaps with the non-connection region when the second barrel lies at the retracted position.

5. The lens barrel according to claim 4, wherein the connection region comprises an aperture opening in a circumferential direction of the second barrel and the aperture and non-connection region function as the accommodating part and another part of the projecting part is configured to at least partially overlap with the aperture when the second barrel lies at the retracted position.

6. The lens barrel according to claim 4, wherein
    the first barrel is provided with a cam follower projecting toward an outer side with respect to the direction of the diameter of the first barrel and is relatively rotatable around the optical axis with respect to the support part, and
    the cam follower is configured to be disposed such that the cam follower at least partially overlaps with the connection region with respect to a circumferential direction of the second barrel when the second barrel lies at the shooting position.

7. The lens barrel according to claim 6, wherein the cam follower is moved wherein the position in the radial direction at least partially overlaps with the connection region when the second barrel lies at the shooting position.

* * * * *

UNITED STATES PATENT AND TRADEMARK OFFICE
CERTIFICATE OF CORRECTION

PATENT NO. : 8,098,446 B2  Page 1 of 1
APPLICATION NO. : 12/155139
DATED : January 17, 2012
INVENTOR(S) : Shuji Iijima It is certified that error appears in the above-identified patent and that said Letters Patent is hereby corrected as shown below:

In the Claims:
Column 10, Line 16, In Claim 3, delete "projectinq" and insert -- projecting --, therefor.

Signed and Sealed this
Seventeenth Day of April, 2012

David J. Kappos
*Director of the United States Patent and Trademark Office*